United States Patent
VanDerWege et al.

(10) Patent No.: US 9,822,714 B2
(45) Date of Patent: Nov. 21, 2017

(54) METHOD AND SYSTEM FOR KNOCK CONTROL

(71) Applicant: Ford Global Technologies, LLC, Dearborn, MI (US)

(72) Inventors: Brad Alan VanDerWege, Plymouth, MI (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 15/139,089

(22) Filed: Apr. 26, 2016

(65) Prior Publication Data

US 2016/0237922 A1 Aug. 18, 2016

Related U.S. Application Data

(63) Continuation of application No. 13/646,428, filed on Oct. 5, 2012, now Pat. No. 9,322,340.

(51) Int. Cl.
*F02D 19/12* (2006.01)
*F02D 41/30* (2006.01)
(Continued)

(52) U.S. Cl.
CPC ............ *F02D 19/12* (2013.01); *F02B 75/12* (2013.01); *F02D 13/0219* (2013.01); *F02D 19/061* (2013.01); *F02D 19/0631* (2013.01); *F02D 19/0689* (2013.01); *F02D 19/084* (2013.01); *F02D 35/027* (2013.01); *F02D 41/0025* (2013.01); *F02D 41/26* (2013.01); *F02D 41/3094* (2013.01); *F02B 2075/125* (2013.01); *F02D 2041/389* (2013.01);
(Continued)

(58) Field of Classification Search
CPC ................ F02D 19/12; F02D 41/3094; F02D 2200/0606; F02D 2200/0608
USPC ............ 123/1 A, 299, 304, 406.31, 431, 689
See application file for complete search history.

(56) References Cited

U.S. PATENT DOCUMENTS

| 7,681,554 B2 | 3/2010 | Stein et al. |
| 8,118,010 B2 * | 2/2012 | Shibata ............... F02D 41/3035 123/295 |

(Continued)

FOREIGN PATENT DOCUMENTS

| CN | 102032063 A | 4/2011 |
| CN | 102345530 A | 2/2012 |

OTHER PUBLICATIONS

Partial Translation of Office Action of Chinese Patent Application No. 201310455192.0, dated Jan. 3, 2017, State Intellectual Property Office of PRC, 9 pages.
(Continued)

*Primary Examiner* — Erick Solis
(74) *Attorney, Agent, or Firm* — Julia Voutyras; McCoy Russell LLP (57) ABSTRACT

Methods and systems are provided for improving engine knock control by accounting for a drop in charge cooling efficiency of a knock control fluid at higher temperatures. In response to the prediction of an elevated temperature of a knock control fluid at a time of release from a direct injector, a pulse width of the injection is adjusted. Any knock relief deficits are compensated for using alternate engine adjustments, such as boost or spark timing adjustments.

17 Claims, 5 Drawing Sheets

(51) Int. Cl.
    *F02D 35/02*    (2006.01)
    *F02D 41/00*    (2006.01)
    *F02D 19/06*    (2006.01)
    *F02D 13/02*    (2006.01)
    *F02D 19/08*    (2006.01)
    *F02D 41/26*    (2006.01)
    *F02D 41/38*    (2006.01)
    *F02B 75/12*    (2006.01)

(52) U.S. Cl.
    CPC ............... *F02D 2200/0608* (2013.01); *F02D 2200/0612* (2013.01); *Y02T 10/123* (2013.01); *Y02T 10/18* (2013.01); *Y02T 10/36* (2013.01)

(56) References Cited

U.S. PATENT DOCUMENTS

| | | |
|---|---|---|
| 8,127,745 B2 | 3/2012 | Surnilla et al. |
| 2007/0017484 A1 | 1/2007 | Kinose |
| 2007/0119420 A1 | 5/2007 | Leone et al. |
| 2008/0017171 A1 | 1/2008 | Stein et al. |
| 2010/0065016 A1 | 3/2010 | Bromberg et al. |
| 2010/0121559 A1 | 5/2010 | Bromberg et al. |
| 2011/0174268 A1 | 7/2011 | Surnilla et al. |
| 2012/0024262 A1 | 2/2012 | Leone |

OTHER PUBLICATIONS

Anonymous, "A V2X Communication of Fuel Type Characteristics Between Gas Station Fuel Pump and Vehicle," IPCOM No. 000234872, Published Feb. 11, 2014, 2 pages.

Anonymous, "A Method to Infer Vehicle Fuel Type via GPS Location and Mapped Seasonal Fuel Information," IPCOM No. 000235552, Published Mar. 7, 2014, 2 pages.

\* cited by examiner

METHOD AND SYSTEM FOR KNOCK CONTROL

CROSS REFERENCE TO RELATED APPLICATIONS

The present application is a continuation of U.S. patent application Ser. No. 13/646,428, entitled "METHOD AND SYSTEM FOR KNOCK CONTROL," filed on Oct. 5, 2012, now U.S. Pat. No. 9,322,340, the entire contents of which are hereby incorporated by reference for all purposes.

FIELD

The present application relates to methods and systems for using a knock control fluid for controlling knock in an internal combustion engine.

BACKGROUND AND SUMMARY

Alternate fuels have been developed to mitigate the rising prices of conventional fuels and for reducing exhaust emissions. For example, alcohol and alcohol-based fuel blends have been recognized as attractive alternative fuels, in particular for automotive applications. Various engine systems may be used with alcohol fuels, utilizing various engine technologies and injection technologies. Further, various approaches may be used to control such alcohol-fuelled engines to take advantage of the charge-cooling effect of the high octane alcohol fuel, in particular to address engine knocking.

For example, in engines configured with a direct injector for delivering fuel or an alternate knock control fluid to engine cylinders, a pulse width of the direct injection may be adjusted to meet the knock control goals. One example approach is shown by Surnilla et al. in U.S. Pat. No. 8,127,745. Therein, an amount of knock control fluid to be direct injected is determined based on an amount of knock relief required, an amount of knock control fluid that is available, a flow rate of the injector, as well as the charge cooling and octane rating of the knock control fluid being injected. A pulse width of the direct injection is then adjusted based on the determined amount.

However, the inventors herein have identified potential issues with such an approach. As an example, injector settings are adjusted based on values (e.g., flow rate through the injector, charge cooling and octane rating of the knock control fluid, etc.) that are typically determined at nominal conditions. However, the actual conditions at the direct injector may be very different. For example, temperature conditions at the direct injector when the injector is first activated may be very different from conditions when the injector has been activated for a while. Specifically, the temperature of the injector may increase during periods where the direct injector is not performing an injection since the injection of a substance can cool the injector. Thus, when operating at mid engine loads, where a knock control fluid is commonly not used, a cylinder may be fueled using a port injector while an injector tip temperature of a cylinder direct injector may become substantially higher (e.g., around 260° C.). If fuel is injected shortly thereafter (e.g., at higher engine loads) for knock relief, the fuel will be at the elevated temperature. In comparison, during regular engine operation, direct injector temperatures may be substantially lower (e.g., around 100° C.). As such, when at or near room temperature, knock control fluids such as ethanol have a higher heat of vaporization. The heat of vaporization, and therefore the charge cooling potential, then decreases with increasing temperature. Consequently, when use of a knock control fluid is resumed (after a period of not using the injector), a pulse width calculated based on the nominal values may not provide sufficient knock relief due to potentially reduced mass flow and reduced charge cooling.

In one example, some of the above issues may be at least partly addressed by a method for an engine comprising, direct injecting a knock control fluid into an engine cylinder, and adjusting an injection parameter of the direct injection based on a temperature of the knock control fluid at a time of release from a direct injector. The adjusted injection parameter may include a pulse width of the injection, an injection amount, a direct injection system pressure, or a combination thereof. In this way, settings for a knock relieving direct injection may be adjusted based on a real time estimate of the charge cooling potential of the injected knock control fluid.

As an example, in response to knock (or in anticipation of knock), an engine control system may determine an initial injection setting for direct injection of a knock control fluid based on nominal operating conditions. This may include an initial amount of fluid to be injected, a pulse width of the injection, a timing of the injection, etc. The control system may then adjust the initial settings based on an estimated or inferred temperature of the knock control fluid at a time of release from the direct injector. For example, the expected fluid temperature may be estimated or inferred based on an idle period of the injector since a last injection, an amount of knock control fluid injected at the last injection, engine conditions during the idle period, thermal mass of the injector, heat transfer from combustion to the injector, heat transfer from the injector to the coolant, heat transfer from the injector to the knock control fluid, estimated temperature of knock control fluid in a common fuel rail upstream of the injector, etc.

As the duration since a last injection from the direct injector increases, while a port injector continues to inject fuel into an engine cylinder, a temperature of the direct injector may increase. This may cause a temperature of the knock control fluid, at a time of release from the direct injector, to also increase, and a charge cooling effect of the knock control fluid to decrease. Therefore, the control system may adjust the initial settings of the knock control fluid injection with a correction factor based on the estimated increase in temperature (and/or the consequent decrease in charge cooling effect). A correction may also be applied to the expected mass flow rate of the knock control fluid through the hot injector based on an estimated vapor pressure of the knock control fluid at the elevated temperature. Based on the correction, a pulse width of the direct injection of the knock control fluid may be adjusted. For example, as an estimated temperature of the fluid at release increases, a pulse width of the injection may be increased. Additionally, or optionally, an injection quantity of the knock control fluid and/or a direct injection system pressure may be increased. In addition, a predicted deficit in knock relief may be compensated for by adjusting one or more other engine operating parameters. For example, the residual knock relief may be provided via spark timing adjustments, boost adjustments, cam phasing adjustments, EGR adjustments, etc.

In this way, a knock control fluid mass can be adjusted by adjusting injection settings of a knock control fluid in anticipation of changes in knock relieving efficiency due to heating of the knock control fluid at a time of release from an injector. By estimating an expected temperature of the fluid at the time of release based on injector conditions, such as based on whether the injector was already activated or idle, a drop in the charge cooling effect of the knock control fluid can be predicted, and knock relief compensating adjustments may be appropriately made. By increasing the pulse width of direct injection of the knock control fluid at elevated injector temperatures, a knock relieving efficiency of the fluid at release can be improved. In addition, injector fouling and thermal degradation can be reduced. By better addressing engine knock, engine performance can be improved.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 1:
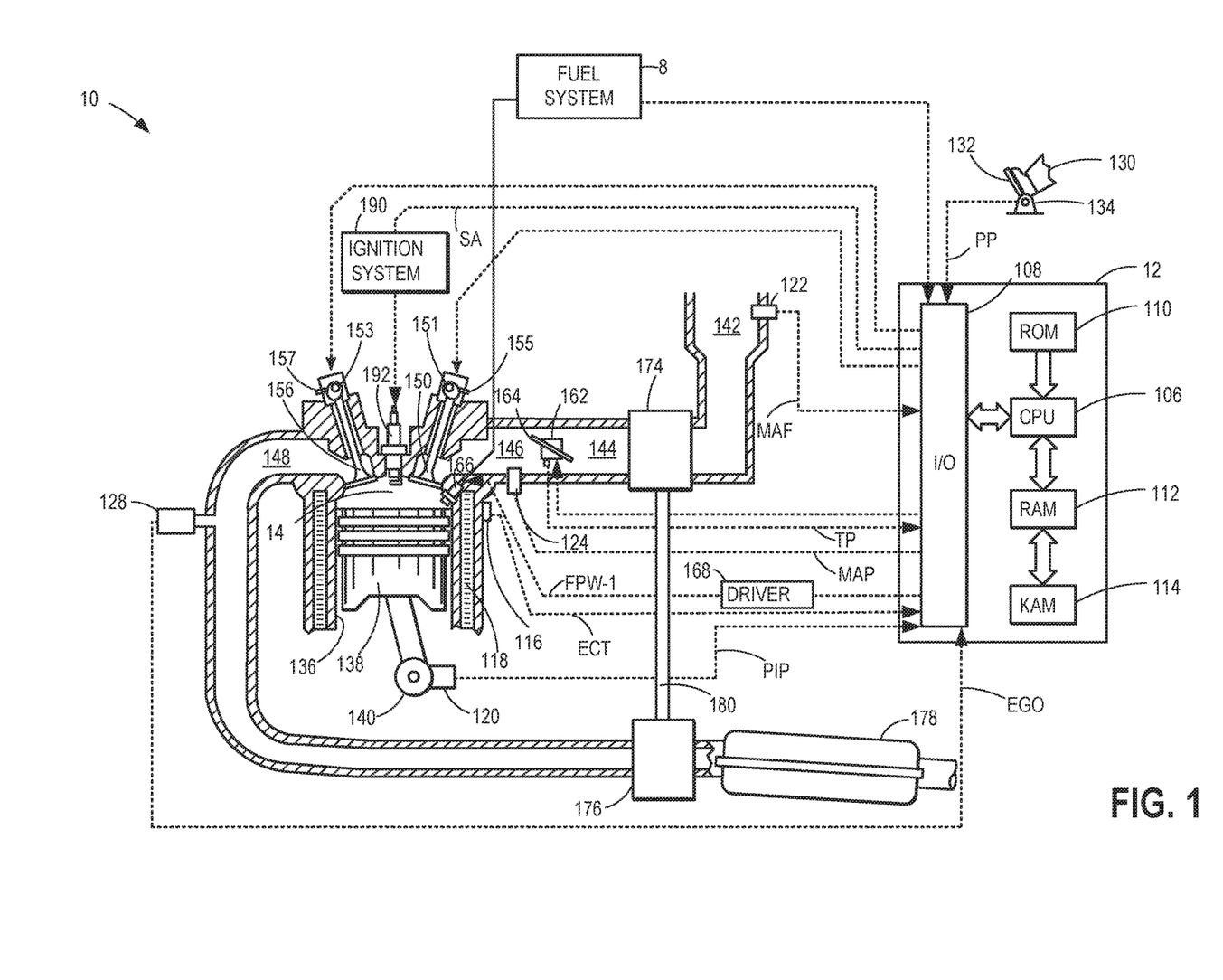
FIG. 1 shows a partial view of a combustion chamber of an engine.
Figure 2:
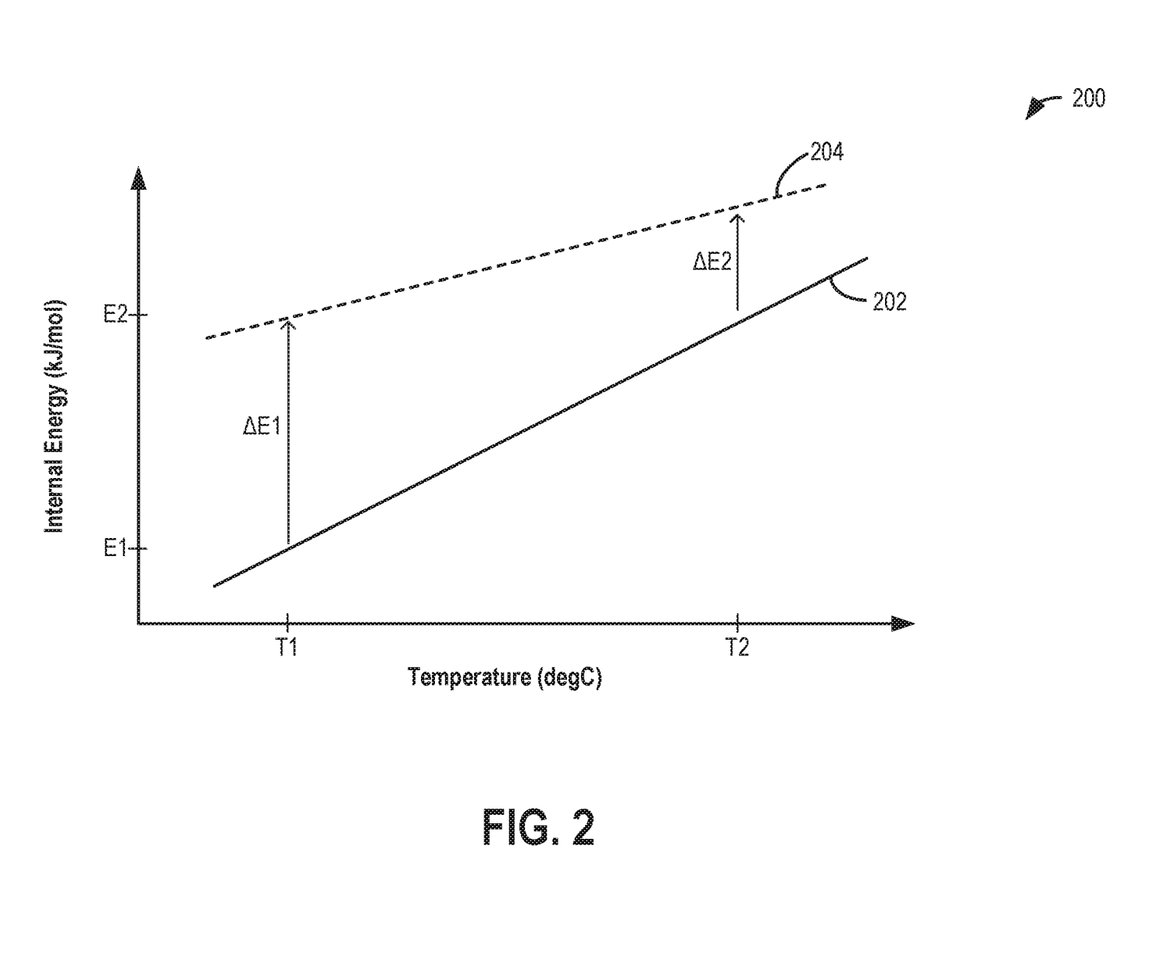
FIG. 2 shows a graph depicting an example relationship between the charge cooling potential of a knock control fluid and fluid temperature.
Figure 4:
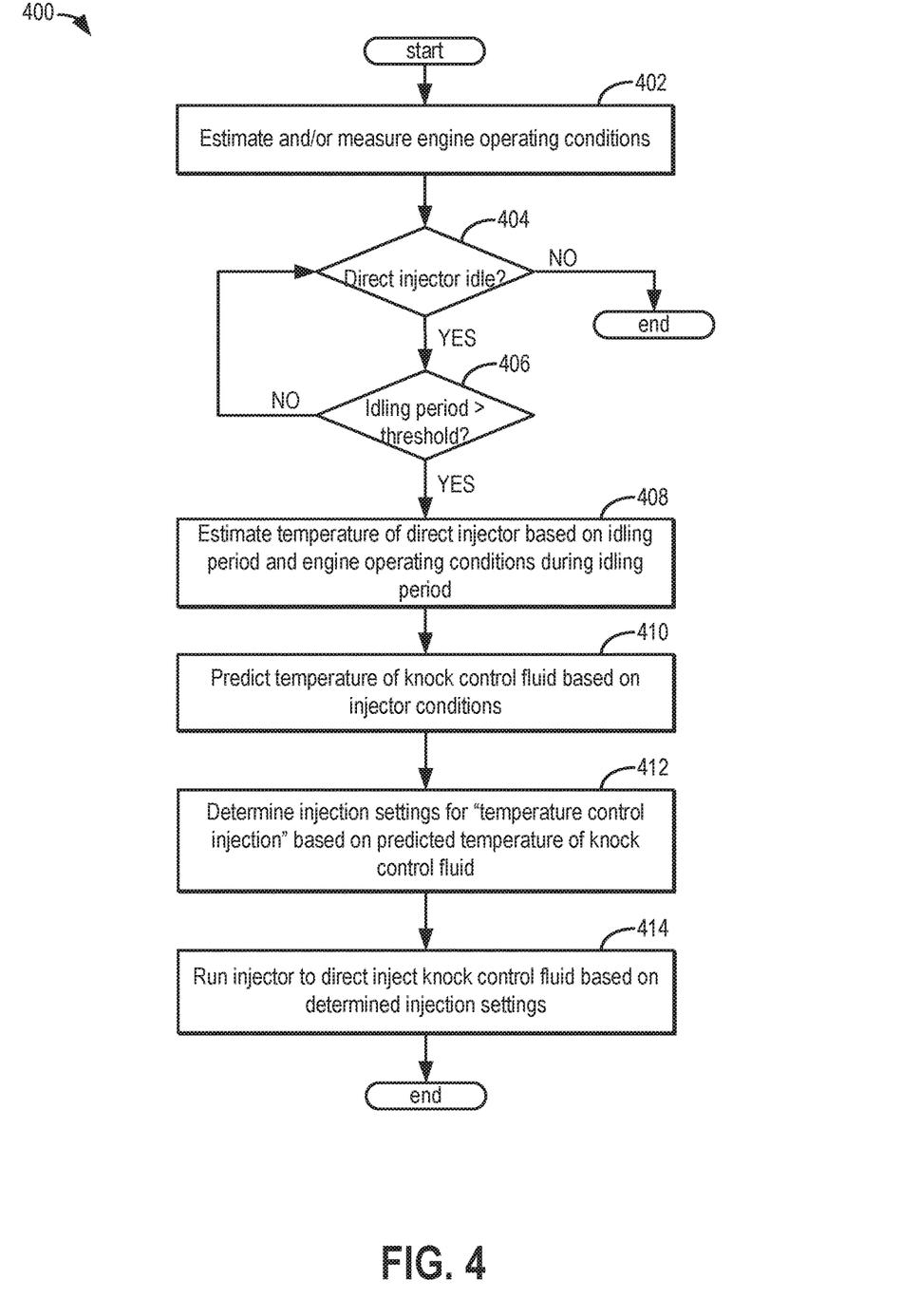
FIG. 4 shows a high level flow chart illustrating a routine that may be implemented for periodically operating a direct injector during idle injector conditions to reduce heating of a knock control fluid.
Figure 5:
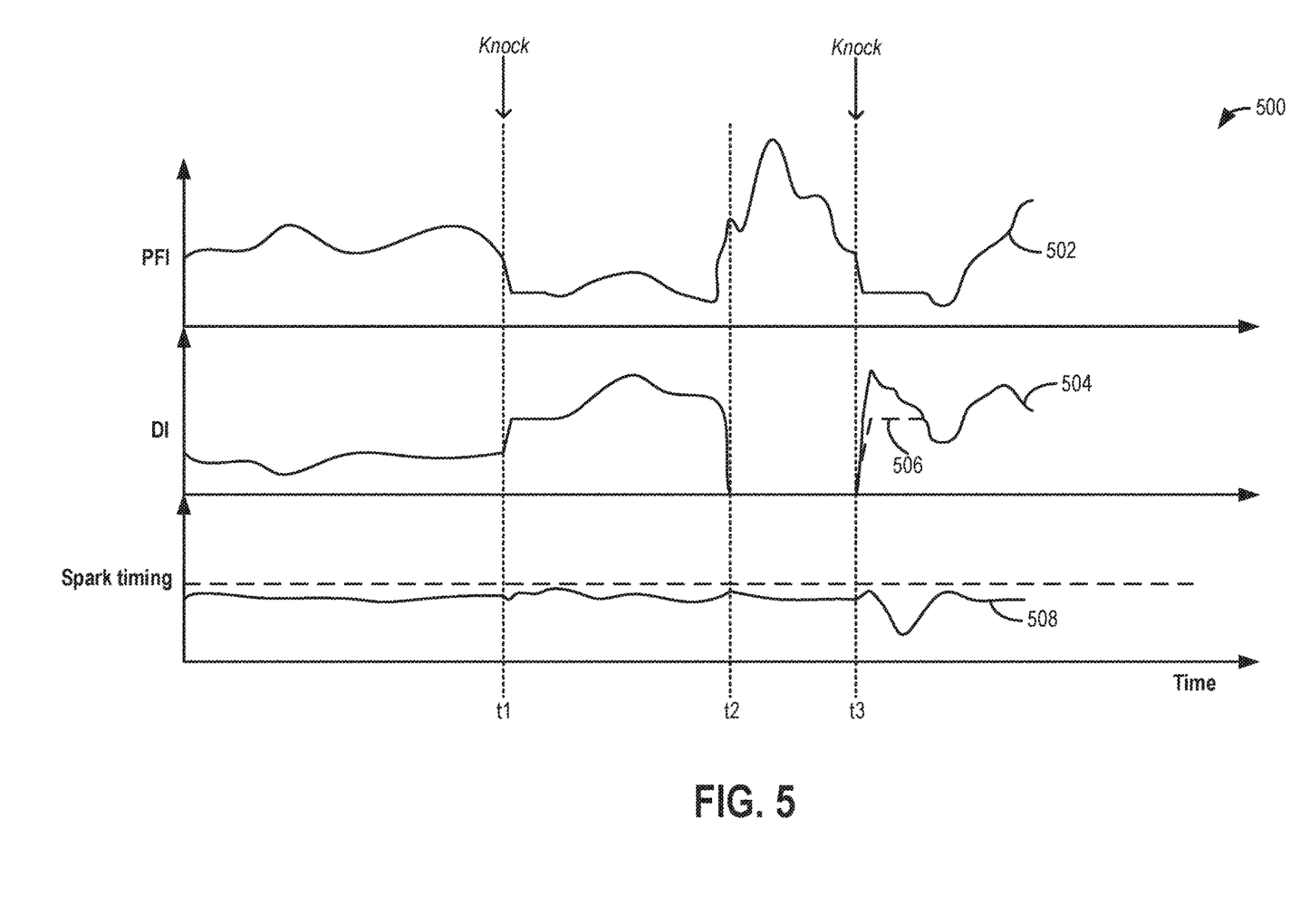
FIG. 5 shows an example adjustment to a knock control fluid injection.

Methods and systems are provided for improving knock control in an engine, such as the engine of FIG. 1. Injection settings for direct injection of a knock control fluid may be adjusted based on an estimated temperature of the fluid at a time of release to compensate for changes in charge cooling efficiency of the fluid at elevated temperatures (FIG. 2). A controller may be configured to perform a control routine, such as the example routine of FIG. 3, to determine initial setting for direct injection of a knock control fluid based on a likelihood of knock and nominal conditions of the fluid. The controller may then predict a temperature of the knock control fluid at a time of release from the direct injector based on injector conditions such as whether the injector is already activated or deactivated, a temperature of the injector, heat transfer from the injector to the fluid, etc. In response to the prediction of an elevated knock control fluid temperature at a time of release, injection settings such as a pulse width of the direct injection may be adjusted. In addition, one or more other engine operating parameters may be adjusted to compensate for any knock deficit resulting from the heated knock control fluid. An example injection adjustment is shown at FIG. 5. The controller may also perform a routine, such as the routine of FIG. 4, to intermittently run the direct injector during conditions when knock fluid injection is not requested to maintain an injector temperature as well as a knock control fluid temperature below respective thresholds. In this way, changes in the charge cooling efficiency of a knock control fluid due to heat transfer from a heated direct injector can be better compensated for.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock control fluid thereto. In some embodiments, the knock control fluid may be a fuel, wherein the injector is also referred to as a fuel injector. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while in one embodiment, the engine may be operated by injecting the variable fuel or knock control fluid blend via a single direct injector; in alternate embodiments, the engine may be operated by using two injectors (a direct injector 166 and a port injector) and varying a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as aircharge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel or knock control fluids with different qualities, such as different compositions. These differences may include different alcohol content, different water content, different octane, different heat of vaporizations, different fuel blends, different water contents, and/or combinations thereof etc. In one example, knock control fluids with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of the fuel or knock control fluid stored in the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

While not shown, it will be appreciated that engine 10 may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided during conditions such as the absence of turbocharger boost, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed. Example routines are elaborated herein at FIGS. 3-4.

During selected engine operating conditions, such as at low engine speeds and under high load conditions, engine knocking may occur. In one example, engine knocking may be addressed by retarding the ignition spark timing, herein also referred to as spark retard. By retarding the ignition spark timing from MBT, cylinder peak pressure and temperature may be reduced, thereby reducing the occurrence of knock. As another example, engine knock may be addressed by injecting (e.g., direct injecting via a direct injector) a knock control fluid into the cylinder. The knock control fluid may be a fuel with high effective octane content, such as an ethanol fuel. As such, the effective octane content of an injected fuel may be composed of various components representing various knock mitigating characteristics of the fuel, such as a combination of the inherent octane of the fluid, a dilution effect of the fluid, and an evaporation effect of the fluid. Thus, for example, an ethanol fuel blend (such as E85) may be directly injected into the cylinder to take advantage of the inherently high octane number of the fuel and the charge cooling effect of the ethanol fuel.

Other example knock control fluids include gasoline, ethanol, methanol, windshield wiper fluid, other alcohols, water, and combinations thereof. As such, to increase the charge cooling effect of the injected knock control fluid, a direct injection of the fluid may be performed in response to knocking, or in response to a feed-forward indication (or likelihood) of knock. Herein, by direct injecting a knock control fluid into the cylinder via a direct injector, the evaporative cooling of the fluid is enhanced and the effective octane number of the fluid injected into the cylinder may be rapidly increased, thereby reducing the knock limit. Based on the amount of knock control fluid direct injected into the cylinder, an amount of fuel that is port injected may be adjusted such that the total amount of fuel delivered via the fuel injectors satisfies the stoichiometric requirements.

As such, a knock control fluid may be direct injected in response to an indication of cylinder knock or based on a feed-forward likelihood of knock. Therein, based on the prevalent engine operating conditions, an amount of engine dilution required to reduce the knock may be determined. Based on the desired engine dilution (that is, the amount of knock relief required), and further based on a flow rate of the direct injector as well as a charge cooling and octane rating of the knock control fluid, a pulse width of the direct injection of the knock control fluid is determined. While the values are estimated at nominal operating conditions, the inventors herein have recognized that actual conditions at the injector may be significantly different. Specifically, an injector tip temperature may be substantially higher when the direct injector is first activated (e.g., after a period of idling or after a period of being deactivated) as compared to the injector tip temperature when the injector is already activated and running (e.g., to provide fuel to an engine cylinder). For example, when the engine is operating at mid to high loads, where knock likelihood is low and injection of the knock control fluid is infrequent, a cylinder may be fueled via a port injector only, and the cylinder combustion can cause the injector tip temperature to rise to as high as 260° C. The first fuel or knock control fluid to be injected once knock relief is again required will be at a similar (elevated) temperature, which is substantially higher than direct injector temperatures during regular injector operation (e.g., around 100° C.). As such, the heat of vaporization of a knock control fluid may decrease with increasing temperature. Thus, the knock efficiency of the injected fluid (e.g., ethanol) may vary based on the temperature of the knock control fluid at a time of release from the direct injector.

In addition, the vapor pressure of ethanol approaches 63 bar near 240° C., which means that when injected, it may strongly flash boil. Such flash boiling may change the shape of the fuel spray and decrease the mass flow rate of the fuel injector.

FIG. 2 shows a map 200 depicting an example relationship between an internal energy of a knock control fluid (in liquid and vapor states) and temperature. Map 200 depicts a change in the internal energy of the knock control fluid, while in a vapor state (at 0.1 bar) over temperature at plot 204 and a change in the internal energy of the knock control fluid, while in a liquid state (at 100 bar) over temperature at plot 202.

As shown, at lower temperatures, such as at T1 (e.g., 40° C.), the vapor state of the fluid has a much higher internal energy (higher by a larger amount ΔE1) than the liquid state of the fluid. This means that at the lower temperature T1, the liquid state of the knock control fluid needs to absorb energy from its surroundings to evaporate. This absorption of energy leads to charge cooling, increasing the knock relieving efficiency of the fluid at lower temperatures. In comparison, at higher temperatures, such as at T2 (e.g., 170° C.), the vapor state of the fluid has an internal energy that is close to the internal energy of the liquid state (higher by a smaller amount ΔE2). This means that at the higher temperature T2, the liquid state of the knock control fluid has substantially the same internal energy as the cool vapor that is desired, and therefore does not need to absorb much energy from its surroundings to evaporate. The reduced absorption of energy leads to reduced charge cooling, and lower knock relieving efficiency of the fluid at higher temperatures.

The inventors herein have recognized that the combined effect of the reduced charge cooling efficiency of the knock control fluid as well as the reduced mass flow rate of the direct injector (due to flash boiling of the fluid) can lead to insufficient knock relief following direct injection of a knock control fluid at elevated temperatures. In particular, for a first number of direct injections when use of a knock control fluid is resumed (following a period of direct injector deactivation or idling), where the pulse width of the injection is based on nominal conditions, sufficient knock relief may not be provided and knock disturbances may persist. As elaborated herein with reference to FIG. 3, an engine controller may lengthen the pulse width of a direct injection of knock control fluid if a direct injector temperature is elevated (or if the knock fluid temperature at release is expected to be elevated). For example, the controller may lengthen the pulse width based on how long the injector was idle (which determines the temperature rise at the injector). As further elaborated with reference to FIG. 4, the controller may also intermittently run a direct injector during conditions when knocking is not occurring and when no knock control fluid injection is requested so as to lower a temperature of the direct injector as well as the temperature of knock control fluid in the fuel rail upstream of the injector so as to improve the charge cooling efficiency of the fluid at release.

Figure 3:
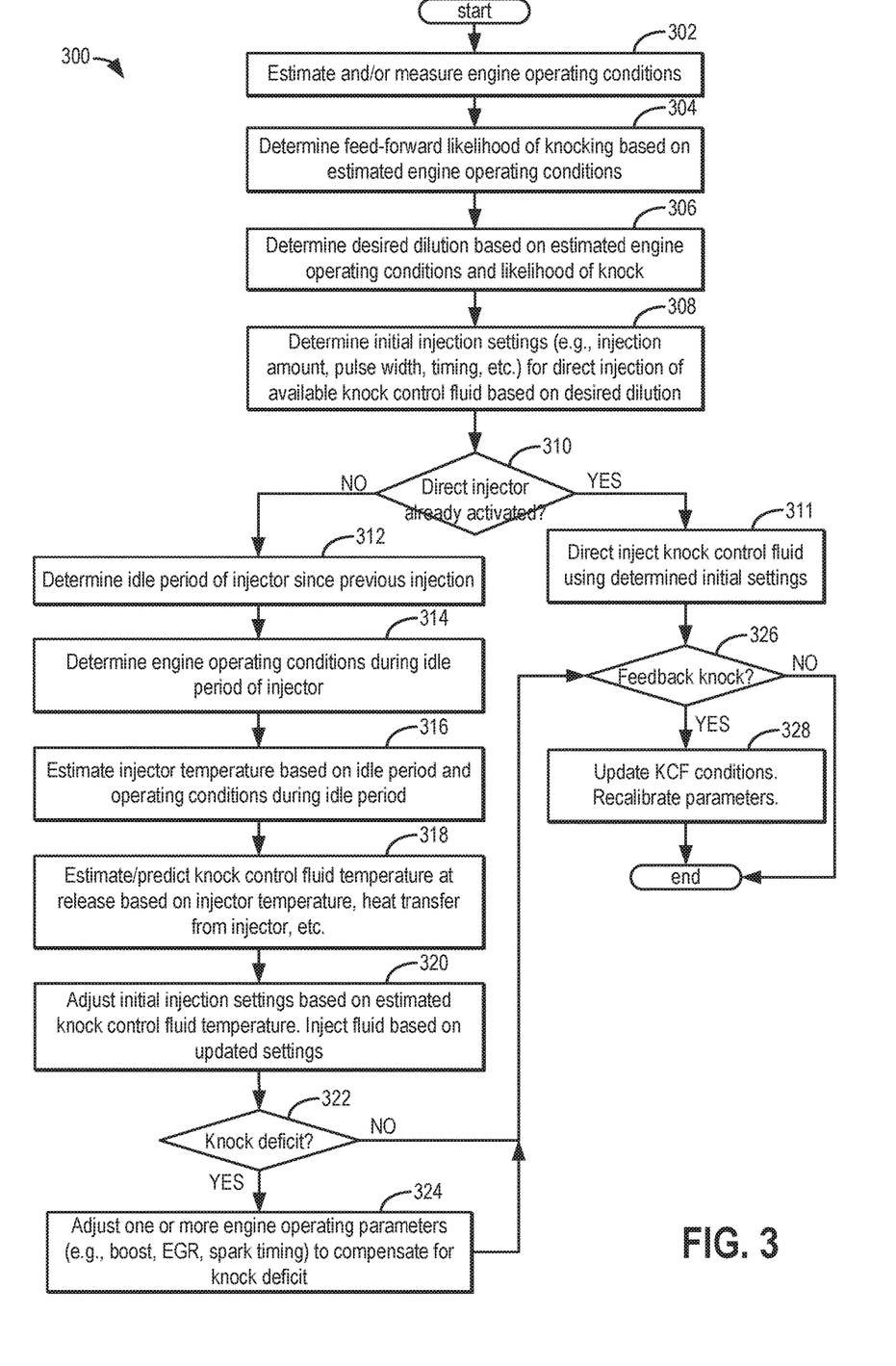
FIG. 3 shows a high level flow chart illustrating a routine that may be implemented for adjusting injection settings for direct injection of a knock control fluid based on a temperature of the fluid at a time of release.

Now turning to FIG. 3, an example routine 300 is shown for adjusting a pulse width of knock fluid injection based on a temperature of the knock control fluid at a time of release from a direct injector. As elaborated previously, an expected rise in fluid temperature (and injector temperature) may be inferred based on whether the injector was previously activated or deactivated. By adjusting the pulse width, knock relief may be better addressed using the knock control fluid.

At 302, engine operating conditions may be estimated and/or measured. These may include, for example, engine speed, desired torque, MAP, BP, ECT, catalyst temperature, intake air temperature, spark timing, boost, etc. At 304, a feed-forward likelihood of engine knocking may be determined based on the estimated engine operating conditions. At 306, a desired engine dilution may be determined based on the estimated engine operating conditions as well as the determined feed-forward likelihood of knock. At 308, initial injection settings for direct injection of an available knock control fluid may be determined. The determined initial settings may include an injection amount, a pulse width of the injection, an injection timing, etc. The initial settings may be determined based on the desired engine dilution as well as nominal settings of the knock control fluid and the injector. That is, the pulse width is determined based on nominal temperature values of the direct injector and nominal charge cooling values of the knock control fluid.

At 310, it may be determined if the direct injector is already activated. As such, a temperature of the injector (e.g., an injector tip temperature) may vary from nominal conditions if the injector was previously deactivated. In particular, since the injection of a knock control fluid (such as ethanol) cools the direct injector, the injector temperature may rise while the injector is deactivated. The rise in injector temperature can also lead to a corresponding increase in knock control fluid temperature at a time of release from the injector but also at a common fuel rail upstream of the injector. Thus, if it is determined that the direct injector was previously activated, then at 311, the routine includes direct injecting the determined amount of knock control fluid (that is, with the initial settings) to provide knock relief.

If it is determined, instead, that the direct injector was previously deactivated, then at 312, the routine includes determining an idle period of the injector since a previous injection. For example, the routine may determine a number of engine cycles for which the injector was previously deactivated. In one example, the direct injector for an engine cycle may have been idle or deactivated due to engine conditions not requiring direct injection of a knock control fluid. Alternatively, the direct injector for an engine cycle may have been idle or deactivated due to engine conditions requiring port injection of fuel only. Herein, the routine may determine a duration (time, number of engine cycles, etc.) for which the direct injector was not in use, or a duration for which only the port injector was in use.

At 314, the routine includes determining engine operating conditions during the idle period of the direct injector. At 316, based on the duration of the idle period (that is, the duration for which the injector was deactivated) as well as engine operating conditions (e.g., cylinder combustion conditions) during the idle period when the direct injector was not in use but the port injector was in use, a direct injector temperature may be estimated. As elaborated above, the direct injector temperature may rise while the injector is deactivated. The routine may determine an increase in the injector temperature (from nominal conditions) based on the duration of the idle period as well as the engine conditions during the idle period.

At 318, the routine includes estimating or predicting a temperature of the knock control fluid at the time of release from the direct injector. The estimation may be based on each of a thermal mass of the direct injector, engine speed and load, heat transfer from the direct injector to the knock control fluid, heat transfer from the direct injector to an engine coolant, and a temperature of knock control fluid in a fuel rail upstream of the direct injector. The estimation may be further based on the nature of the knock control fluid (that is, the type of knock control fluid, the composition of the fluid, etc.). As an example, the temperature may be estimated based on an octane rating of the knock control fluid. As another example, the temperature may be estimated based on an alcohol content (e.g., ethanol content) of the knock control fluid.

At 320, the routine includes adjusting the initial settings of the knock fluid injection based on the temperature of the predicted temperature of the knock control fluid. That is, one or more injection parameters may be adjusted. The adjusted parameters may include, for example, a pulse width of the injection, an injection pressure, and an injection amount. In one particular example, a pulse width of the direct injection may be adjusted based on the estimated temperature of the knock control fluid at a time of release from the direct injector. The adjusting may include, as a temperature of the knock control fluid at a time of release from the direct injector increases, increasing the pulse width of the direct injection. An amount of increase in the pulse width may be further based on a composition of the knock control fluid. For example, the increase may be based on the alcohol content (e.g., ethanol content) of the knock control fluid.

While the pulse width of the direct injection is increased, a port injection of fuel may be correspondingly decreased. In this way, the pulse width of the direct injection is adjusted based on whether the direct injector was previously activated or deactivated, with the pulse width of the direct injection increased if the direct injector was previously deactivated.

It will be appreciated that while FIG. 3 discusses adjusting a pulse width of the direct injection, in alternate embodiments, one or more other injection parameters of the direct injection may be adjusted to vary the knock control fluid mass based on the estimated temperature of the knock control fluid at the time of release from the direct injector. In particular an injection amount or knock control fluid mass may be increased by increasing the pulse width and maintaining the direct injection system pressure in one example, while in alternate examples, the increase in knock control fluid mass may be achieved by increasing a direct injection system pressure and maintaining a pulse width. In still further examples, the increase in knock control fluid mass may be achieved by increasing each of the pulse width and the DI system pressure.

At 322, it may be determined if there is a knock deficit. Specifically, it may be determined if there is a deficit in knock relief resulting from the adjusted pulse width of the knock fluid injection. For example, even with the increased pulse width of injection that accounts for the drop in charge cooling efficiency of the knock control fluid at higher temperatures, adequate knock relief may not be provided. Thus, if a knock deficit is determined, at 324, the routine includes compensating for the knock relieving deficit (resulting from the adjusted pulse width of the knock control fluid at the elevated temperature) by adjusting one or more alternate engine operating parameters. The one or more alternate engine operating parameters may include a boost level, variable cam timing, cam phasing, spark ignition timing, and EGR. For example, a boost level may be decreased, spark timing may be retarded, and/or an EGR amount may be increased.

As such, the settings used for knock may have been based on a feed-forward likelihood of knock. If no knock deficit is determined at 322, or after compensating for the knock deficit at 324, or after injecting the knock control fluid with the initially determined settings at 311, the routine proceeds to 326 to determine if there is any feedback indication of knock. If there is no feedback knock, the routine may end. Else, at 328, the routine includes updating details regarding the knock control fluid. For example, in response to feedback knock, a composition of the knock control fluid may be updated and the one or more alternate engine operating parameters may be recalibrated. As another example, the feedback knock may be used to adjust a knock fluid temperature model. It will be appreciated that while the above example shows determining initial and updated injection settings for direct injection of a knock control fluid responsive to a feed-forward likelihood of knock (that is, in anticipation of knock and before knock occurs), in alternate examples, the initial settings may be determined in response to an (actual) indication of knock, and the initial settings may be updated responsive to a temperature of the direct injector being above a threshold temperature at the time of injection.

In one example, an engine controller may increase a pulse width of injection of a knock control fluid from a direct injector into an engine cylinder based on the injector being previously deactivated. An amount of increase in the pulse width of the direct injection may be based on a number of engine cycles for which the injector was previously deactivated, and further based on an ethanol content of the knock control fluid. The pulse width of a concomitant port injection of fuel may be correspondingly adjusted to maintain stoichiometry at the exhaust. The controller may then adjust one or more of boost level, spark timing, and EGR during the injection based on a difference between a desired engine dilution and an engine dilution provided by the knock control fluid. In the current example, the injection of knock control fluid may be responsive to a feed-forward indication of knock. In response to a further feedback indication of knock, a composition of the knock control fluid may be updated and one or more of the boost spark timing, and EGR may be further adjusted.

It will be further appreciated that in some examples, in addition to adjusting the pulse width of direct injection of a knock control fluid responsive to injector temperatures, an engine controller may intermittently activate and run the direct injector, during conditions when knock control fluid injection is otherwise not requested (e.g., non-knocking conditions), so as to lower a temperature at the injector. In doing so, a temperature of the knock control fluid upon release from a direct injector is reduced and the temperature-dependent loss in charge cooling efficiency of the knock control fluid is also reduced. An example routine for performing such an operation is now elaborated with reference to routine 400 of FIG. 4.

At 402, the routine includes estimating engine operating conditions including, for example, engine speed, desired torque, MAP, BP, ECT, catalyst temperature, intake air temperature, spark timing, boost, etc. At 404, the routine includes confirming if a direct injector is idle. As such, the injector being idle includes the injector being deactivated and not injecting fuel or a knock control fluid into a cylinder while a port injector of the same cylinder continues to inject fuel into the cylinder. If the direct injector is not idle, the routine may end. Else, if the direct injector is idle, then at 406, an idling period of the direct injector may be determined and compared to a threshold to determine if the idling period is higher than the threshold period. The threshold period may include a threshold duration since a last injection by the direct injector, or a threshold number of engine cycles since the last injection by the direct injector.

If the direct injector has been idle for longer than the threshold period, then at 408, the routine includes estimating a temperature of the direct injector based on the idling period as well as based on engine operating conditions during the idling period. As previously elaborated, since injection of the knock control fluid (or fuel) causes cooling at the direct injector, the injector temperature may increase while the direct injector is deactivated but while the port injector is still injecting fuel into the combusting cylinder. Thus, as the idling period increases, a temperature of the direct injector may increase.

At 410, the routine includes predicting a temperature of knock control fluid at the injector. For example, a temperature of knock control fluid at a time of release from the (hot) injector may be predicted. Alternatively, a temperature of knock control fluid in a common rail upstream of the (hot) injector may be estimated.

At 412, injection settings for a "temperature control injection" may be determined based on the predicted temperature of the knock control fluid. As such, this includes injection settings for injection of a knock control fluid responsive to the elevated temperature of the injector and not responsive to knock. The injection settings determined may include, for example, an amount of fluid to be injected, a timing of the injection, as well as a pulse width of the injection. Herein, as the temperature of the direct injector increases, and a predicted temperature of the knock control fluid increases, the pulse width of the direct injection may be increased. The increase may be further adjusted based on the composition, the heat capacity and/or the octane rating of the knock control fluid (e.g., the ethanol or other alcohol content of the knock control fluid) so as to maintain the temperature of the direct injector below a threshold temperature. In doing so, a temperature of the knock control fluid may also be maintained within a range outside of which the charge cooling efficiency of the fluid is reduced. An injection setting of the port injector may be correspondingly adjusted so as to maintain an exhaust air-to-fuel ratio at or around stoichiometry. At 414, the routine includes direct injecting the knock control fluid based on the determined settings.

As an example, while a direct injector coupled to an engine cylinder is deactivated and while a port injector coupled to the engine cylinder is active and injecting fuel to the cylinder, a controller may selectively activate the direct injector coupled to the cylinder and direct inject knock control fluid into the cylinder responsive to a temperature of the direct injector. Herein, the direct injecting of an amount of knock control fluid is performed without receiving an indication of cylinder knock (and without receiving a feed-forward or feedback indication of knock). The direct injecting responsive to the temperature of the direct injector may include, as the temperature of the direct injector exceeds a threshold temperature, increasing a pulse width of the direct injection of knock control fluid. The pulse width of the direct injection may be further based on an octane rating of the knock control fluid and an estimated temperature of the knock control fluid in a fuel rail upstream of the direct injector. Then, during engine running with both the direct injector and port injector fueling the cylinder, the controller may direct inject knock control fluid into the cylinder responsive to an occurrence of cylinder knock. At that time, a pulse width of the direct injection may be based on a duration of direct injector idling (for reducing injector temperature).

Now turning to FIG. 5, map 500 shows an example adjustment to the direct injection of a knock control fluid based on a temperature of the knock control fluid at the time of release, as inferred from a duration of direct injector idling. Map 500 depicts fueling of a cylinder via port injection at plot 502 and fueling of the same cylinder via direct injection at plot 504. Changes in a spark ignition timing, relative to MBT, are shown at plot 508.

In the depicted example, prior to t1, based on engine operating conditions, the engine cylinder may be receiving fuel via each of direct and port injection (plots 502, 504) with a ratio of the injections adjusted based on engine conditions to maintain an exhaust at stoichiometry. That is, both the port and direct injectors may be activated. In addition, spark timing may be maintained substantially around MBT (plot 508).

At t1, in response to an indication of knock, an amount of fuel or knock control fluid (e.g., ethanol fuel) that is direct injected into the cylinder via the direct injector is increased to address the knock. An amount of fuel (e.g., gasoline fuel) that is port injected into the cylinder via the port injector is correspondingly decreased. In response to the indication of knock being received while the direct injector was activated, knock control fluid may be directly injected into the knocking cylinder with a first, shorter pulse width. Herein, the lower temperature at the injector and the lower temperature of the knock control fluid may enable the charge cooling efficiency of the knock control fluid to be higher, therefore necessitating a smaller pulse width of knock control fluid injection.

At t2, due to a change in engine operating conditions (e.g., change in engine speed and load conditions), direct injection of fuel or knock control fluid to the engine cylinder is not requested. For example, the engine may be operating at mid loads where knocking is infrequent. Alternatively, the engine may be operating under conditions where port injection provides more engine performance benefits. That is, the port injector may remain activated while the direct injector is idled or deactivated. The direct injector may remain deactivated or idle for a duration between t2 and t3.

At t3, an indication of knock is received. While the direct injector is deactivated between t2 and t3, a temperature of the direct injector may rise substantially above the nominal operating temperature. Due to the rise in direct injector temperature, a temperature of the knock control fluid at a fuel rail upstream of the injectors may increase, while also increasing the expected temperature of the fluid at a time of release from the injector. As such, this may cause the charge cooling efficiency of the fluid to drop. Thus, at t3, in response to the indication of knock, a knock control fluid may be direct injected into the knocking cylinder. However, due to the direct injector being previously deactivated, and an expected temperature of the knock control fluid upon release from the injector being elevated (with a lower charge cooling efficiency), knock control fluid may be directly injected with a second, longer pulse width. This longer pulse width (shown by solid plot 504) may be longer than the pulse width of knock control fluid injection that would have been otherwise applied to abate the knock if the injector was already activated (as shown by dashed plot 506). Herein, the higher temperature at the injector and the higher temperature of the knock control fluid may reduce the charge cooling efficiency of the knock control fluid, therefore necessitating a longer pulse width of fluid injection. In addition, to compensate for a knock deficit resulting from the adjusted pulse width, spark timing may be retarded (plot 508). In one example, the knock deficit may be compensated for by combining more knock control fluid with retarded spark. Alternatively, the knock deficit may be compensated for by only retarding spark after a limit has been reached in the amount of knock fluid (such as 100% of the fueling).

The pulse width of direct injection of the knock control fluid from the direct injector into the engine cylinder may be temporarily increased based on the direct injector being previously deactivated. For example, the direct injection at the increased pulse width may be continued for 10 engine cycles, after which the increasing may be terminated. In one example, an amount of increase in the pulse width of the injection may be based on a first number of engine cycles for which the injector was previously deactivated, and the increasing pulse width of direct injection may be terminated after a second number of injections of the knock control fluid from the direct injector, wherein the second number of injections is based on the first number of engine cycles.

In this way, during a first condition, when knock occurs and a direct injector is already activated (knock occurring at t1), a controller direct injects a knock control fluid with a first pulse width, and during a second condition, when knock occurs and the direct injector was previously deactivated (knock occurring at t3), the controller direct injects the knock control fluid with a second pulse width longer than the first pulse width. Herein, during the first condition, the knock occurs when an engine cylinder is being fueled by each of a port and direct injector and during the second condition, the knock occurs when the engine is being fueled by a port injector only. In addition, during the first condition, the direct injector is at a first, lower temperature, while during the second condition, the direct injector is at a second, higher temperature. Likewise, during the first condition, a predicted knock control fluid temperature at release from the direct injector is a first, lower temperature, while during the second condition, the predicted knock control fluid temperature at release from the direct injector is a second, higher temperature. The controller may, during the first condition, maintain spark ignition timing at MBT, while during the second condition, the controller may retard spark timing from MBT. The spark retard applied may be adjusted based on a difference between a desired engine dilution and an engine dilution provided by the direct injection of the knock control fluid at the second pulse width.

In this way, temperature dependent reduction in charge cooling efficiency of a knock control fluid can be better accounted for. By adjusting settings of a direct injection of a knock control fluid based on an estimated or anticipated increase in direct injector temperature, changes in a temperature and knock relieving efficiency of the fluid can be predicted and compensated for. By adjusting a pulse width of fluid injection based on whether the injector was previously activated or deactivated, a knock relieving efficiency of the fluid at release can be more accurately predicted and a knock relief provided by the fluid can be improved. In addition, injector fouling and thermal degradation can be reduced. By better addressing engine knock, engine performance can be improved.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method for an engine, comprising:
   boosting intake air with a compressor; and
   responsive to engine knock,
   direct injecting a knock control fluid into an engine cylinder from a previously deactivated direct injector; and
   adjusting an injection parameter of the direct injection based on a temperature of the knock control fluid at a time of release from a direct injector and further based on a composition of the knock control fluid.

2. The method of claim 1, wherein the injection parameter is a pulse width and wherein the adjusting includes, as the temperature of the knock control fluid at the time of release from the direct injector increases, increasing the pulse width of the direct injection.

3. The method of claim 2, wherein an amount of increase in the pulse width is based on the composition of the knock control fluid including an alcohol content of the knock control fluid.

4. The method claim 2, wherein the pulse width of the direct injection is further adjusted based on whether the direct injector was previously activated or deactivated, the pulse width of the direct injection further increased if the direct injector was previously deactivated.

5. The method of claim 1, wherein the temperature of the knock control fluid at the time of release from the direct injector is estimated based on each of a thermal mass of the direct injector, engine speed and load, heat transfer from the direct injector to the knock control fluid, heat transfer from the direct injector to an engine coolant, and a temperature of knock control fluid in a fuel rail upstream of the direct injector.

6. The method of claim 1, wherein the injection parameter includes one or more of a pulse width, a direct injection system pressure, and an injection amount; and wherein the direct injecting responsive to engine knock includes direct injecting responsive to an indication of knock from a knock sensor or a feed-forward likelihood of knock.

7. The method of claim 6, further comprising, compensating a knock relieving deficit resulting from the adjusted pulse width by adjusting one or more alternate engine operating parameters.

8. The method of claim 7, wherein the one or more alternate engine operating parameters include a boost level, variable cam timing, cam phasing, spark ignition timing, and EGR.

9. The method of claim 8, further comprising, in response to feedback knock, updating a learned composition of the knock control fluid, recalibrating the one or more alternate engine operating parameters, and updating parameters of a knock control fluid temperature model.

10. The method of claim 1, wherein the adjusting includes increasing a pulse width of the direct injection relative to a pulse width that would have been applied to abate the engine knock if the direct injector was already activated.

11. A system, comprising:
    an engine having a turbocharger and a variable valve timing system for engine cylinder valves; and
    a controller with instructions stored in non-transitory memory for
    during a first condition, when knock occurs and a direct injector is already activated, direct injecting a knock control fluid with a first pulse width based on an indication of the knock; and
    during a second condition, when knock occurs and the direct injector was previously deactivated, direct injecting the knock control fluid with a second pulse width longer than the first pulse width.

12. The system of claim 11, wherein the controller further includes instructions for during the first condition, maintaining spark ignition timing at MBT, and during the second condition, retarding spark timing from MBT, the spark retard adjusted based on a difference between a desired engine dilution and an engine dilution provided by the direct injection of the knock control fluid at the second pulse width.

13. A method for an engine, comprising:
boosting engine intake air to the engine with a compressor of a turbocharger;
inducting boosted intake air to a cylinder through cylinder valves, the valves operating with variable valve timing; and
temporarily increasing a pulse width of injection of a knock control fluid from a direct injector into an engine cylinder responsive to an indication of knock based on the injector being previously deactivated.

14. The method of claim 13, wherein an amount of increase in the pulse width of the injection is based on a first number of engine cycles for which the injector was previously deactivated, and where the increasing terminates after a second number of injections of the knock control fluid from the direct injector, the second number of injections based on the first number of engine cycles.

15. The method of claim 14, wherein the amount of increase is further based on an ethanol content of the knock control fluid, and where the increase is more than would be injected to abate the knock if the direct injector had been previously operating.

16. The method of claim 13, further comprising, adjusting one or more of boost level, spark timing, and EGR during the injection based on a difference between a desired engine dilution and an engine dilution provided by the knock control fluid.

17. The method of claim 16, wherein the injection of knock control fluid is responsive to a feed-forward indication of knock, the method further comprising, in response to a feedback indication of knock, updating a composition of the knock control fluid and further adjusting one or more of the boost level, spark timing, and EGR.

* * * * *